(12) United States Patent
Rao et al.

(10) Patent No.: US 12,210,882 B2
(45) Date of Patent: Jan. 28, 2025

(54) SYSTEM AND METHOD FOR MANAGING MANAGEMENT CONTROLLER EMBEDDED DEVICES

(71) Applicant: Dell Products L.P., Round Rock, TX (US)

(72) Inventors: Sanjay Rao, Round Rock, TX (US); Mahesh Babu Ramaiah, Bangalore (IN); Ajay Shenoy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 179 days.

(21) Appl. No.: 18/175,658

(22) Filed: Feb. 28, 2023

(65) Prior Publication Data

US 2024/0289139 A1 Aug. 29, 2024

(51) Int. Cl.
*G06F 9/4401* (2018.01)
(52) U.S. Cl.
CPC ................... *G06F 9/4416* (2013.01)
(58) Field of Classification Search
CPC ........ G06F 9/4416; G06F 9/44; G06F 9/4401; G06F 9/4418; G06F 9/442; G06F 9/445; G06F 9/44505
See application file for complete search history.

(56) References Cited

U.S. PATENT DOCUMENTS

| 11,544,229 | B1* | 1/2023 | Seideman | G06F 16/2358 |
| 11,842,179 | B2* | 12/2023 | Reineke | G06F 9/451 |
| 11,924,029 | B2* | 3/2024 | Reineke | H04L 67/535 |
| 2019/0004907 | A1* | 1/2019 | Sela | G06F 11/0793 |
| 2020/0192740 | A1* | 6/2020 | Parry | G06F 3/0659 |
| 2021/0240551 | A1* | 8/2021 | Joyce | H04L 67/02 |

* cited by examiner

*Primary Examiner* — Raymond N Phan
(74) *Attorney, Agent, or Firm* — Womble Bond Dickinson (US) LLP

(57) ABSTRACT

Methods and systems for managing operation of data processing systems are disclosed. To manage operation of the data processing systems, the data processing systems may present unified communication and management systems. The unified communication and management systems may be used to manage the operation of any number of management controller embedded devices hosted by the data processing systems. The unified communication and management systems may allow for communication with and management of the management controller embedded devices without requiring that the management systems directly interact with the management controller embedded devices.

20 Claims, 7 Drawing Sheets

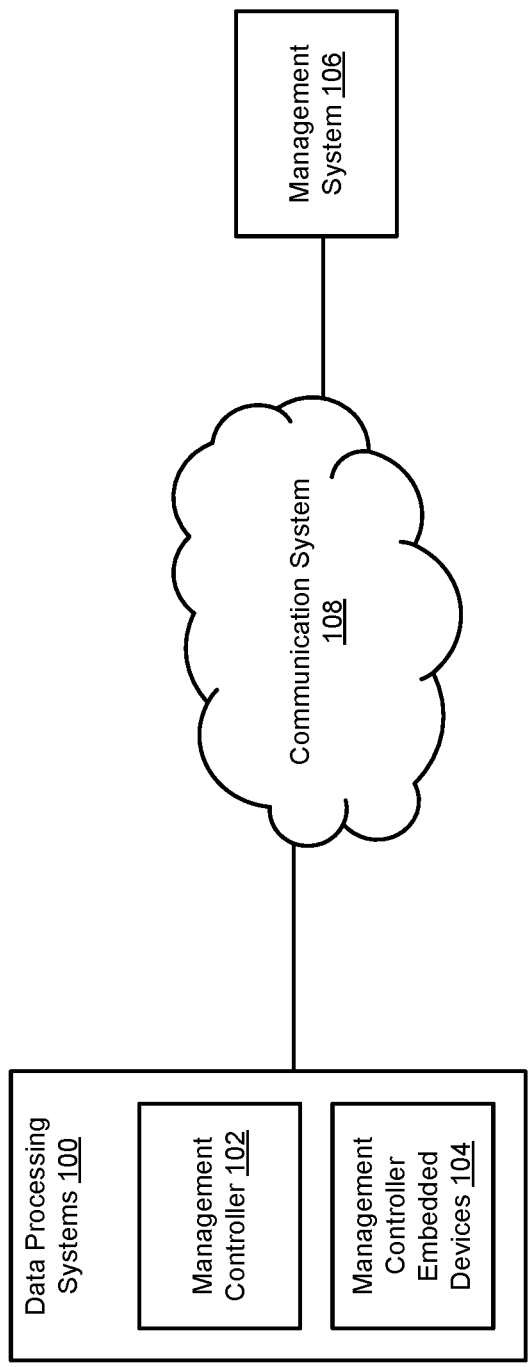

SYSTEM AND METHOD FOR MANAGING MANAGEMENT CONTROLLER EMBEDDED DEVICES

FIELD

Embodiments disclosed herein relate generally to device management. More particularly, embodiments disclosed herein relate to systems and methods to manage the operation of data processing systems in a distributed system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
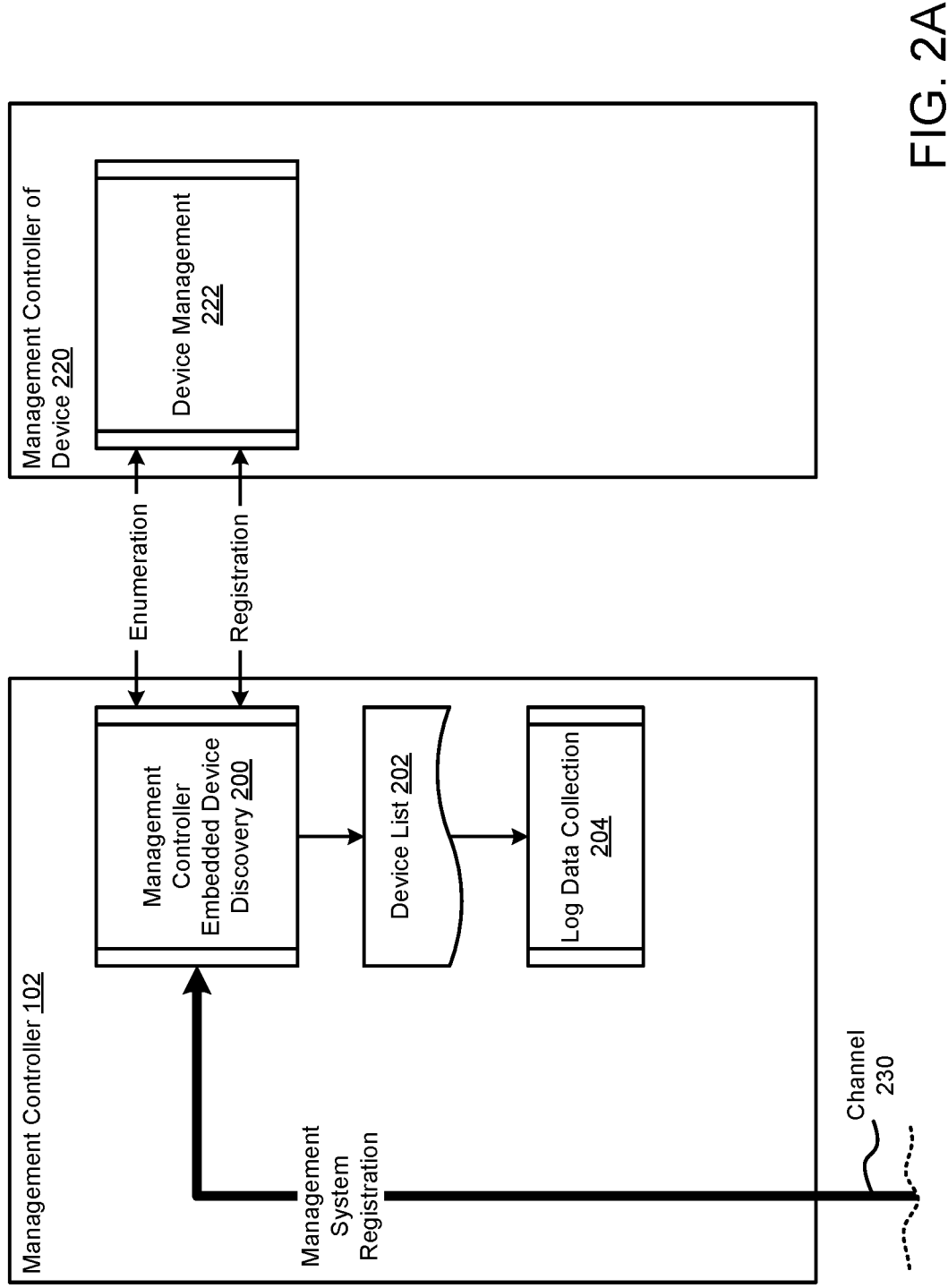
FIGS. 2A-2C show diagrams illustrating data flows in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of data processing systems, a management system may obtain information regarding their operation and update their operation based on the obtained information.

The data processing systems, and some devices hosted by the data processing systems, may be implemented using management controller embedded devices. An management controller embedded device may be a device that is able to present itself to the management system in a distributed environment and participate in its management. To do so, the management controller embedded devices may implement network end points to which communications from the management system may be directed.

However, as the number of management controller embedded devices hosted by a data processing system grows over time, it may become progressively more difficult to manage the individual management controller embedded devices and incur additional management overhead. To manage the overhead and reduce complexity for managing data processing systems, the data processing systems may present a unified communication and management system through which multiple management controller embedded devices hosted by the data processing system may be managed.

The unified communication and management system may do so by registering the management controller embedded devices. During registration, the management controller embedded devices may provide information usable to selectively retrieve information from the management controller embedded devices usable to triage various types of undesired operation.

Once registered, the management controller embedded devices may stream information regarding their operation. The stream information may be analyzed by the unified communication and management system to identify when any of the management controller embedded devices are subject to undesired operation. When subject to undesired operation, the unified communication and management system may selectively retrieve a limited amount of log data from the management controller embedded devices that is likely to allow for triage to be completed successfully.

The aforementioned information may be integrated into a condition report reflecting the aggregate condition of a host data processing system. The condition report may then be provided to a management system which may analyze it to select how to modify the operation of the data processing system and hosted management controller embedded devices to address the undesired operation.

By doing so, any number of management controller embedded devices may be managed by a management system using a unified communication and management system. Thus, embodiments disclosed herein may address, among others, the technical challenge of limited computing resources for management. By consolidating management of multiple management controller embedded devices into a unified communication and management system, a management system may more efficiently analyze the condition of the data processing system and hosted management controller embedded devices. For example, the management system may not need to implement multiple analyzation schemes for various portions of data obtained directly from different management controller embedded devices, may not need to establish/maintain multiple network connections to the respective management controller embedded devices, etc.

In an embodiment, a method for managing communications between a management system and management controller embedded devices (MCEDs) is disclosed. The method may include obtaining, by a management controller of a data processing system, a device identifier from a portion of a stream from a MCED of the MCEDs, the portion of the stream indicating that the MCED is in an undesired operating state; identifying, by the management controller, a uniform resource identifier based on the undesired operating state; obtaining, by the management controller and from the MCED, a portion of a log using the uniform resource identifier; generating, by the management controller, a condition report for the data processing system based at least in part on the portion of the log and the undesired operating state; providing, by the management controller, the condition report to the management system; obtaining, by the management controller and responsive to the condition report, a management operation; and initiating, by the management controller, performance of the management operation to manage the undesired operating state.

The method may also include, prior to obtaining the communication: enumerating, by the management controller, the MCEDs; registering, by the management controller, the MCED of the MCEDs; obtaining, by the management controller, an association between a device identifier tag provided by the MCED during the registering of the MCED, error message identifiers that the MCED adds to the stream, and the uniform resource identifier obtained during the registering of the MCED; and establishing, by the management controller, a record based on the association.

Registering the MCED may include providing, by the management controller, a list of undesired operating states to the MCED; and obtaining, by the management controller, a corresponding list of uniform resource identifiers comprising the uniform resource identifier.

Obtaining the portion of the log may include sending, by the management controller, a log request directed to a first resource indicator of the corresponding list of uniform resource identifiers; and obtaining, by the management controller and responsive to the log request, a portion of a second log, the portion of the second log comprising log entries relevant for remediation of a second undesired operating state of the undesired operating states corresponding to the first resource indicator.

Generating the condition report may include populating a first portion of the condition report with first information based on the portion of the log; populating a second portion of the condition report with second information based on the portion of the log; and adding an indicator to the condition report indicating that the first portion and the second portion are both associated with the MCED.

Generating the condition report may also include populating a third portion of the condition report with third information based on a portion of a third log from a second MCED of the MCEDs; and adding a second indicator to the condition report indicating that the third portion is associated with the second MCED.

Generating the condition report may also include adding a third indicator to the condition report indicating that the MCED is operating in the undesired operating state; and adding a fourth indicator to the condition report indicating that the MCED is operating in another undesired operating state of the undesired operating states.

The data processing system may host the MCEDs, and each of the MCEDs may be an end point presenting device.

In an embodiment, a non-transitory media is provided. The non-transitory media may include instructions that when executed by a processor cause the computer-implemented method to be performed.

In an embodiment, a data processing system is provided. The data processing system (or a management controller hosted by the data processing system) may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of data processing systems 100. Data processing systems 100 may provide the computer implemented services to users of data processing systems 100 and/or to other devices (not shown), and/or may cooperate with other devices that provide the computer implemented services. Different data processing systems may provide similar and/or different computer implemented services.

For example, any of data processing systems 100 may be members of cloud environments that provide the computer implemented services. The cloud environments may include any number of devices that provide computer implemented services.

To provide the computer-implemented services, data processing systems 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide certain computer-implemented services, the hardware and/or software components may need to operate in predetermined manners. If the hardware and/or software components do not operate in the predetermined manners, then a data processing system may be unable to provide all, or a portion, of the computer-implemented services that it normally provides.

In general, embodiments disclosed herein may provide methods, systems, and/or devices for managing the operation of data processing systems 100. To manage the operation of data processing system 100, management system 106 may (i) collect information regarding the operation of a data processing system, and/or components thereof, and (ii) modify the operation of the data processing system, and/or components hereof. By doing so, management system 106 may manage the operation of any number of data processing systems 100. Accordingly, the data processing systems may be more likely to successfully provide desired computer implemented services over time.

To collect information and modify the operation of the data processing system, management system 106 may communicate with data processing systems 100. However, due to the proliferation of devices with self-report and/or self-management capabilities, any of data processing systems 100 may include any number of management controller embedded devices 104.

A management controller embedded device may be a hardware device that may present itself to management systems for management purposes. For example, a management controller embedded device may include an embedded computing system (e.g., a management controller) that manages the operation of the devices. The embedded computer may include functionality to identify operation of various portions of the device, log information regarding its operation, modify configuration and/or hardware components of the devices, and/or perform other management functionalities. A management controller embedded device may be, for example, a graphics processing unit, a smart network interface card, a data processing unit, or any other type of device that may include management capabilities.

The management capabilities may be implemented by, for example, presenting the management controller embedded devices to external systems (e.g., via in-band our out-of-band communications) as a separately manageable device from a host data processing system.

However, if management controller embedded devices 104 present themselves as being separate from a host data processing system, management of the data processing system may be more difficult. For example, it may not be clear which data processing system host a management controller embedded device, how modification of the management controller embedded device may impact operation of a host data processing system, what information reported by the management controller embedded device means (e.g., different management controller embedded devices may format information regarding their operation differently), whether undesired operation (e.g., or an undesired operating state in which undesired operation takes place) of some management controller embedded devices is contemporaneous with undesired operation of other management controller embedded devices, etc. The respective management controller embedded devices may attempt to provide information regarding themselves separately to management system 106 thereby fracturing the view of the overall operation of a host data processing system.

Additionally, the computational overhead for communicating with multiple end point presented by management controller embedded devices of a single data processing system may be increased when compared to communicating with a single end point for management of a data processing system. For example, if different management controller embedded devices 104 implement different communication schemes, then management system 106 may also need to implement corresponding communication schemes thereby placing additional computational overhead for management of data processing systems. Similarly, parsing, correlating, and otherwise analyzing different reports from different management controller embedded devices may incur additional overhead when compared to analyzing a single report reflecting the operation of the single data processing system, and management controller embedded devices hosted thereby.

To reduce the complexity of managing data processing system, reduce the computational overhead for management, and/or for other benefits, a data processing system in accordance with an embodiment may implement a single reporting and management system for all hosted management controller embedded devices.

To implement the reporting and management system, each of data processing systems 100 may host an instance of management controller 102. Management controller 102 may manage communications between (i) management controller embedded devices and a host data processing system, (ii) monitor the operation of the management controller embedded devices, (iii) obtain reports reflecting the aggregate operation of the management controller embedded device and the host data processing system using the monitored operation, (iv) provide the reports to management system 106, (v) obtain management operations from management system 106 that are responsive to the provided reports, and (iv) initiate performance of the management operations.

The reports obtained by management controller 102 may delineate operation of the management controller embedded devices hosted by the data processing systems, and undesired operation of the respective management controller embedded devices. Consequently, management system 106 may be provided with a nuanced view of the operation of a data processing system, as well as hosted management controller embedded devices.

To obtain the reports, management controller 102 may implement a registration system through which management controller embedded devices are enumerated and managed. During registration, the management controller embedded devices may provide management controller 102 with information through which logs likely usable to triage certain types of undesired operation may be retrieved. For example, the management controller embedded devices may provide, during registration, various uniform resource identifiers. Management controller 102 may use the uniform resource identifiers to retrieve certain logs when corresponding undesired operation of the management controller embedded devices is identified. Consequently, when undesired operation of the management controller embedded devices is identified, only information likely to be usable to triage the undesired operation may be retrieved. By doing so, the computational overhead for obtaining and distributing reports regarding operation of a data processing system may be reduced by limiting the amount of information collected and used in obtaining the reports.

Management system 106 may manage data processing systems 100 (e.g., the processing complexes of the data processing systems), and the hosted management controller embedded devices 104. To do so, management system 106 may utilize the reports provided by management controller 102 to select management operations to be performed to manage operation of the data processing systems, and components thereof. When doing so, management system 106 may rely on the information being provided in the reports as being in a standardized format with certain demarcations, delineations, and/or otherwise conforming to a predetermined schema. By doing so, the analysis implemented by management system 106 may be standardized (e.g., in contrast to, for example, analyzing reports that may have varying formats) thereby improving the analysis of throughput. Consequently, a management system in accordance with embodiments disclosed herein may be able to management a larger number of data processing systems.

Figure 3A:
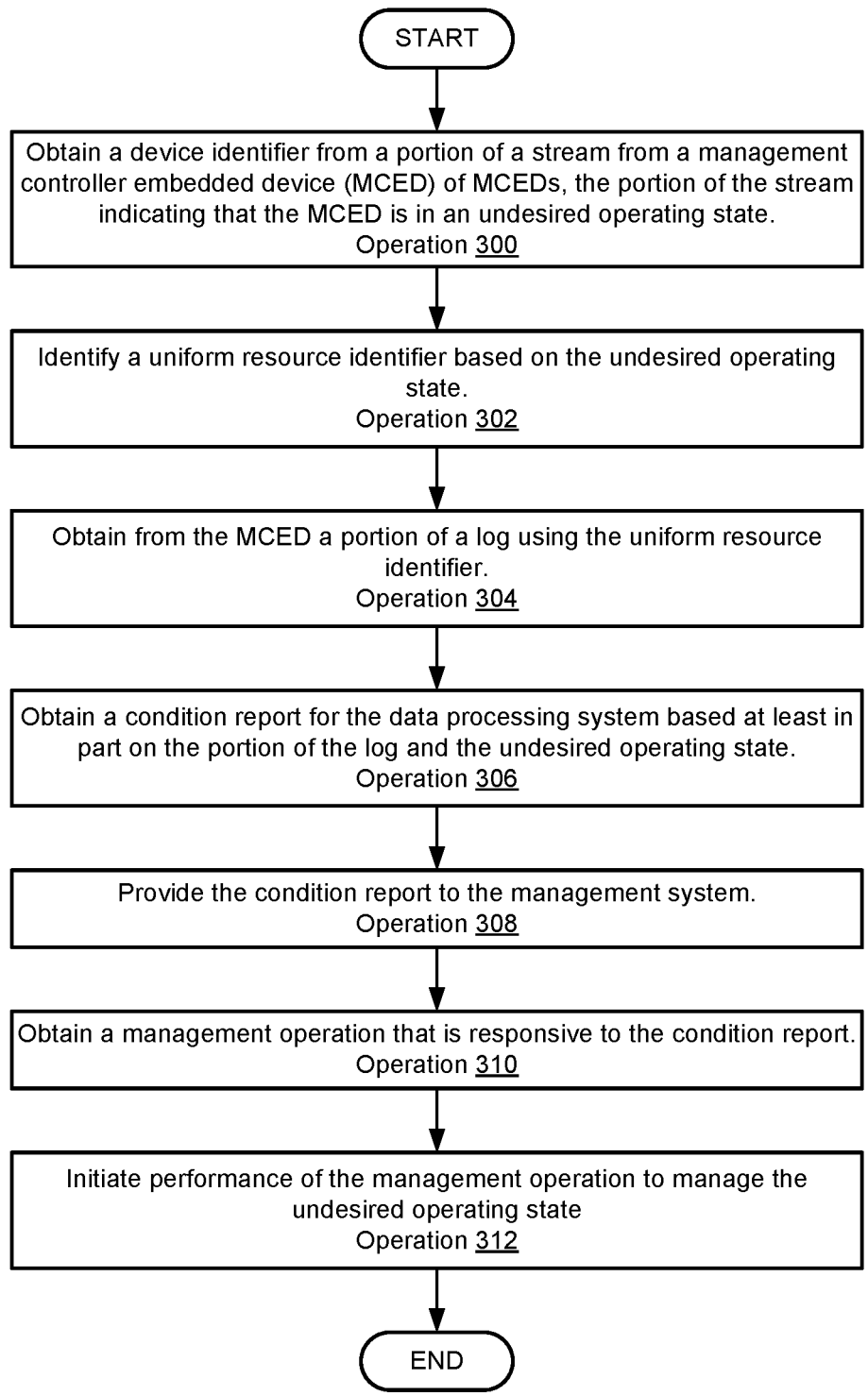
FIGS. 3A-3B show flow diagrams illustrating methods of managing operation of data processing systems in accordance with an embodiment.
Figure 3B:
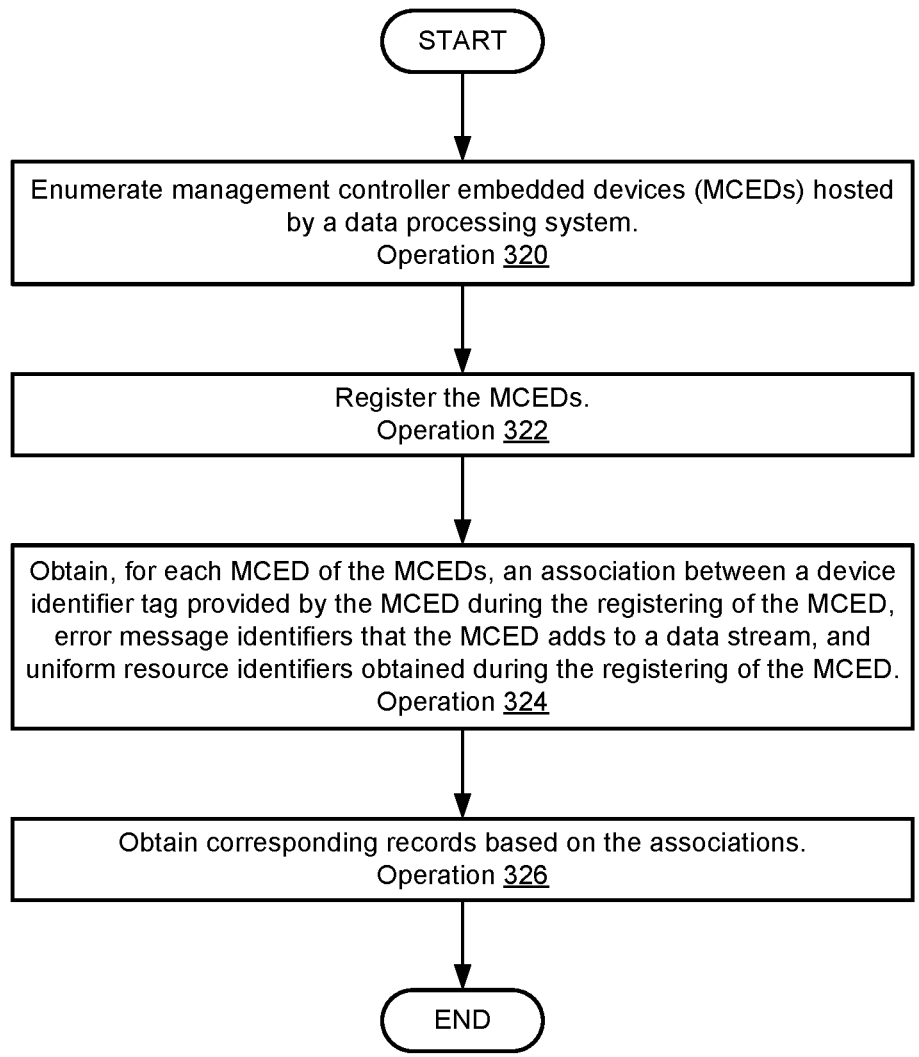

When providing their functionality, any of data processing system 100 and management system 106 may perform all, or a portion, of the method illustrated in FIGS. 3A-3B.

Any of data processing systems 100 and/or management system 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Management system 106 may be implemented with multiple computing devices. The computing devices of management system 106 may cooperatively perform processes for managing the operation of data processing systems 100.

The computing devices of management system 106 may perform similar and/or different functions.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2B:
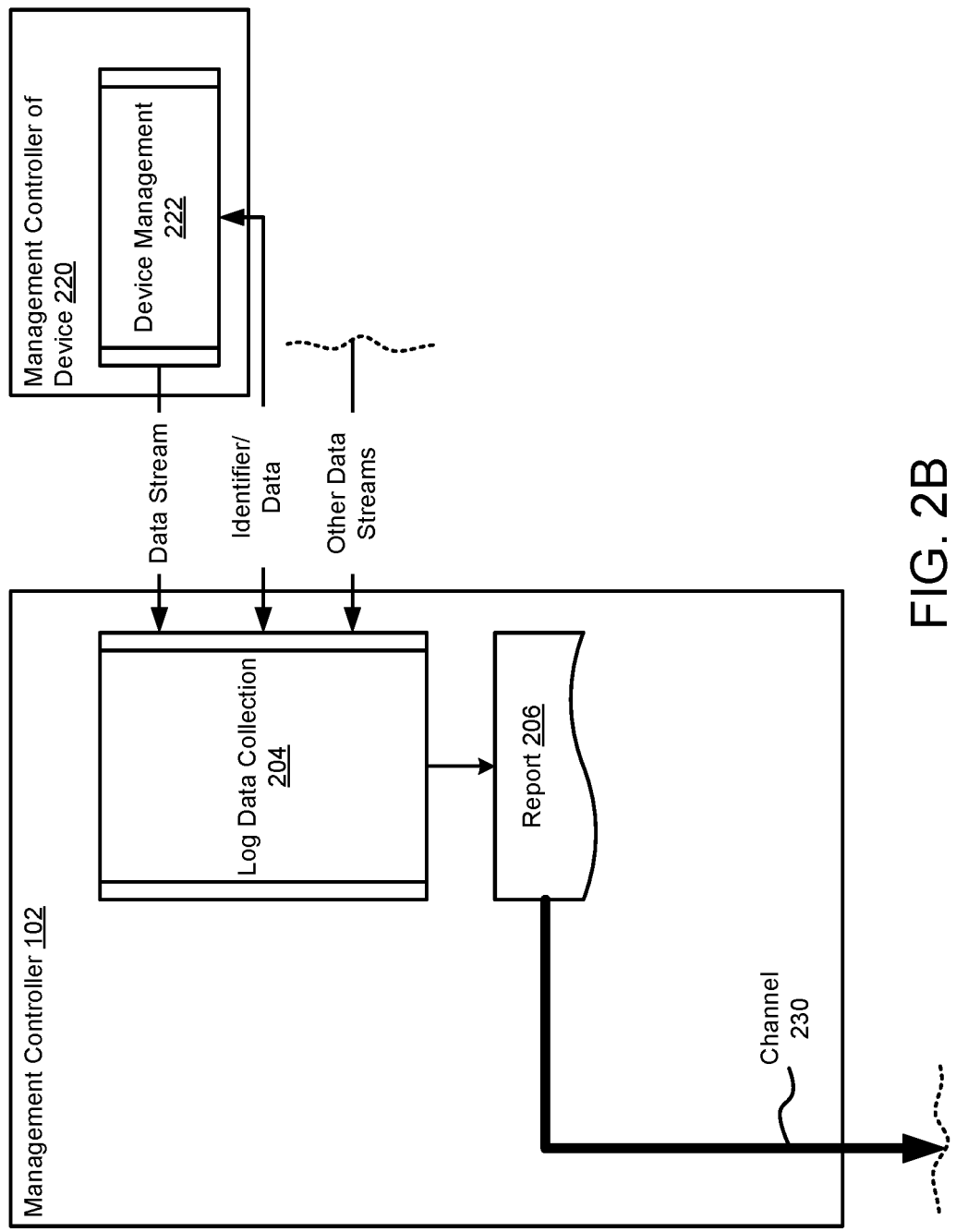
Figure 2C:
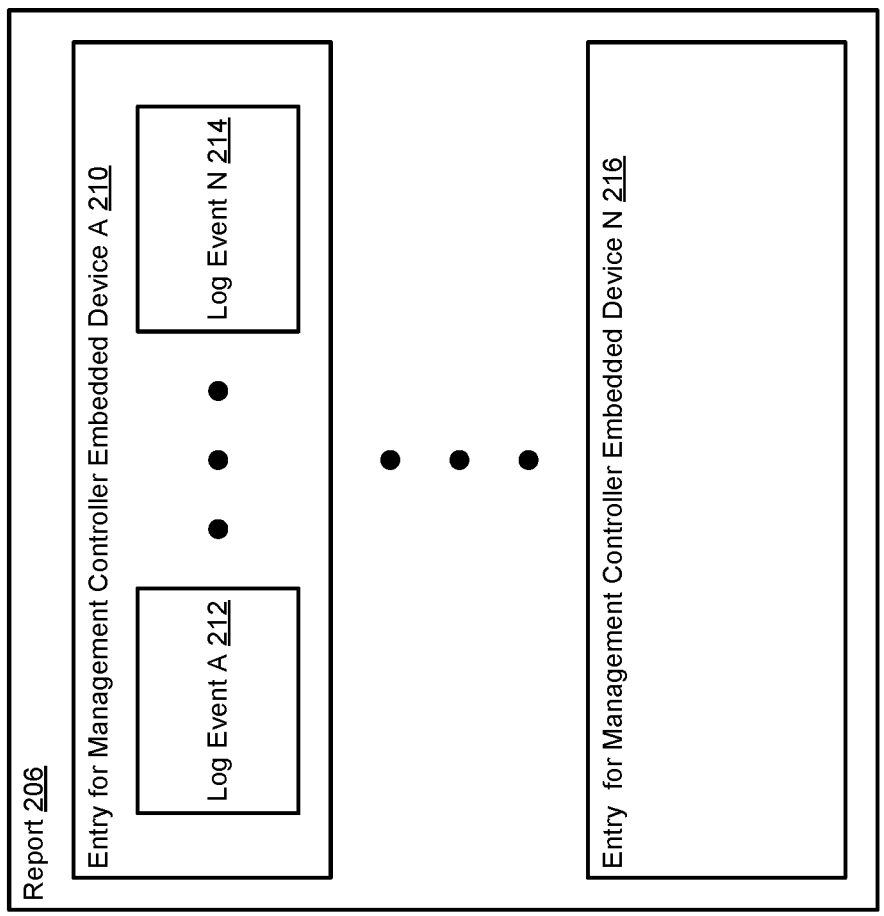

To further clarify embodiments disclosed herein, diagrams illustrating data flows implemented by and data structures used by a system over time in accordance with an embodiment are shown in FIGS. 2A-2C.

Turning to FIG. 2A, a first data flow diagram illustrating data flows, data processing, and/or other operations that may be performed by the system of FIG. 1 in accordance with an embodiment is shown.

Consider a scenario in which a data processing system hosts management controller 102 and a device which includes management controller of device 220. To manage the data processing system and management controller of device 220, management controller 102 may implement a unified information collection and presentation system for a management system.

To implement the unified information collection and presentation system, management controller 102 may perform management controller embedded device discovery process 200. During management controller embedded device discovery process 200, management controller 102 may (i) identify management controller of device 220 (e.g., by communicating with a device management 222 process of the device, or other entity), and (ii) generate a device list 202 or other representation of the enumerated end point presenting devices.

During the communication process, management controller of device 220 may be registered with management controller 102. To register with management controller 102, device management 222 process may provide (i) an identifier for management controller of device 220, (ii) uniform resource identifiers for various types of undesired operation of the device, and/or other information usable to manage the device. This information may also be included in device list 202 so that management controller 102 may (i) identify which device is impacted by undesired operation, and (ii) retrieve logs and/or other information from the device relevant to triaging the undesired operation.

Once management controller of device 220 is registered, management controller 102 may initiate log data collection 204. During log data collection 204, management controller 102 may identify undesired operation of the device and take action to notify a management system of the operation of the device. Refer to FIG. 2B for additional details regarding collection and use of information from the device.

Management controller embedded device discovery 200 may be performed, for example, (i) upon power on of the host data processing system, and/or (ii) responsive to a request from a management system for registration of the data processing system for management purposes.

For example, when the host data processing system is initially deployed, management controller 102 may attempt to register itself with the management system for management purposes. Management controller 102 may do so by communicating with the management system via channel 230 (e.g., which may be an in-band or out-of-band channel depending on which management controller 102 includes a separate network connection or utilizes a host data processing system network connection).

Turning to FIG. 2B, a second data flow diagram illustrating data flows, data processing, and/or other operations that may be performed by the system of FIG. 1 in accordance with an embodiment is shown.

Returning to the discussion of log collection 204 process, during the process device management 222 may send a data stream to management controller 102. The data stream may include information regarding the operation of the device hosting management controller of device 220. For example, the information may include various errors codes and identifiers indicating (i) when undesired operation has occurred, (ii) the device experiencing the undesired operation, and (iii) the type of the undesired operation.

When an error code for a device is obtained, management controller 102 may perform a lookup or other process in the device list to identify (i) the device and (ii) uniform resource identifiers associated with the type of the error code (which may indicate a type of undesired operation). During log data collection 204, once the uniform resource identifier is identified, it may be used to query device management 222 process (or other processes).

When so queries, a selection of logs and/or other information associated with the uniform resource identifier may be provided to management controller 102. Consequently, management controller 102 may obtain a limited amount of information likely to be relevant to the undesired operation of the device (e.g., if other uniform resource identifiers were identified during the lookup, then different logs/information may have been retrieved).

While data retrieval is being performed, log data collection 204 process may continue to receive the data stream from the device, as well as other data streams from other management controller embedded devices registered with management controller 102.

Using the obtained data, report 206 may be generated. Refer to FIG. 2C for additional details regarding report 206.

Once obtained, report 206 may be provided to a management system. The management system may analyze report 206 and select management operations for performance by a data processing system. Management controller 102 may receive (e.g., via channel 230) information regarding the management operations, and may initiate performance of the management operations.

For example, management controller 102 may instruct any of the management controller embedded devices to perform corresponding portions of the management operations.

Turning to FIG. 2C, a third data flow diagram illustrating data flows, data processing, and/or other operations that may be performed by the system of FIG. 1 in accordance with an embodiment is shown.

To communicate the state of the operation of a data processing system, information regarding the operation of hosted management controller embedded devices may be added to report 206. To do so, the information obtained from the management controller embedded devices may be analyzed and used to generate entries for report 206. Report 206 may include any number of entries (e.g., 210-216).

Each of the entries may include information in a schema compliant format that (i) is interpretable by a management system and (ii) includes information usable to attempt to remediate undesired operation of the data processing system, or devices hosted by the data processing system. For example, an entry may include any number of log events (e.g., 212-214). A log event may be based on a portion of a log or other type of data retrieved from a management controller embedded device.

Each of the log events may be standardized for efficient interpretation by the management system. For example, different type of management controller embedded devices may log information regarding their respective operation in different manners. Consequently, different logs may require different interpretation. The log events populated in report 206 may be standardized thereby removing the need for nuanced interpretation by the management system.

In addition to entries, report 206 may include information usable to discriminate (i) entries associated with different management controller embedded devices, and (ii) types of undesired operation of the management controller embedded devices. For example, report 206 may include metadata reflecting these classifications, may be arranged in accordance with a schema or other system by which the arrangement may convey these classifications, etc.

In an embodiment, any of management controller 102 and/or management controller of device 220 are implemented using a hardware device including circuitry. The hardware device may be, for example, a digital signal processor, a field programmable gate array, or an application specific integrated circuit. The circuitry may be adapted to cause the hardware device to perform the functionality of management controller 102 and/or management controller of device 220 as discussed herein. Management controller 102 and/or management controller of device 220 may be implemented using other types of hardware devices without departing embodiment disclosed herein.

In an embodiment, any of management controller 102 and/or management controller of device 220 are implemented using a processor adapted to execute computing code stored on a persistent storage that when executed by the processor performs the functionality of management controller 102 and/or management controller of device 220 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, any of management controller 102 and/or management controller of device 220 include storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed herein. Any of these data structures may be implemented using, for example, lists, tables databases, linked lists, unstructured data, and/or other types of data structures.

As discussed above, the components of FIG. 1 may perform various methods to manage operation of data processing systems. FIGS. 3A-3B illustrate methods that may be performed by the components of the system of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing MCEDs in accordance with an embodiment is shown. The method may be performed by any of data processing systems 100, management controller 102, management system 106, and/or other components of the system shown in FIG. 1.

At operation 300, a device identifier from a portion of a stream from a management controller embedded device (MCED) is obtained. The stream may be a stream from the MCED that includes information regarding operation. For example, the stream may include data structures that identify the MCED and indicate types of undesired operation that the MCED is experiencing. The stream may not include log data or other large volumes of data. The device identifier may be obtained by monitoring the stream for data structures. The device identifier may be obtained from a data structure communicated by the stream. The data structure may also indicate (e.g., based on an error code) an undesired operating state of the MCED.

At operation 302, a uniform resource identifier (URI) is identified based on the undesired operating state. The URI may be identified by performing a lookup or other type of discrimination based on the undesired operating state. For example, the type of the undesired operating state may be used as a key to identify the URI in a data structure, such as a lookup table. The device identifier may also be used as key. Thus, in the data structure, device identifier-type of undesired operation-URI triples may be present, or other types of data arrangements usable to identify URIs based on device identifiers and types of undesired operation.

At operation 304, a portion of a log is obtained from the MCED using the URI. The portion of the log may be obtained by requesting the portion of the log from the MCED using the URI. For example, the URI may serve as a key usable by the MCED to identify the portion of the log from other portions of the log and/or other logs. The portion of the log may be obtained by sending a request for the portion of the log to the MCED using the URI.

At operation 306, a condition report for the data processing system is obtained based at least in part on the portion of the log and the undesired operating state. The condition report may be obtained by populating the condition report based on the undesired operating state, the portion of the log, and the MCED. For example, one or more records may be added to the condition report that reflect various information regarding the operation of the MCED specified by the portion of the log. The information may be added in a manner that conforms to a schema known to a management system that will analyze the condition report. Additionally, the information may be added in a manner that allows an analyzer of the condition report to identify that the added information is in reference to the MCED and the type of the undesired operating state of the MCED.

At operation 308, the condition report is provided to the management system. The condition report may be provided to the management system by encapsulating the sending a copy of the condition report to the management system via a network communication, by publishing existence of the condition report to the management system, and/or via other methods.

At operation 310, a management operation that is responsive to the condition report is obtained. The management operation may be obtained by receiving it from the management system via a network communication, by reading it via a subscription, and/or via other methods.

The management operation may be selected by the management system. For example, the management system may analyze the condition report and select the management operation in an attempt to manage an impact of the undesired operating state. The management operation may be selected, for example, to return the operating state of the MCED to a desired (e.g., nominal) operating state.

At operation 312, performance of the management operation is initiated to manage the undesired operating state. The performance may be initiated by, for example, providing the management operation to a management controller of the MCED for execution, by providing the management operation to a host data processing system (e.g., a processing complex of the host) for execution, and/or via other methods.

The method may end following operation 312.

Using the method shown in FIG. 3A, any number of MCEDs may be managed efficiently through generation and distribution of condition reports reflecting aggregate operation of a data processing system, and components thereof. Doing so may reduce the complexity and overhead in managing multiple devices that each may include a management controller tasked with managing the respective operation of the host devices.

Turning to FIG. 3B, a flow diagram illustrating a method of managing communications between MCEDs and a management system in accordance with an embodiment is shown. The method may be performed by any of data processing systems 100, management controller 102, management system 106, and/or other components of the system shown in FIG. 1.

At operation 320, MCEDs hosted by a data processing system are enumerated. The MCEDs may be enumerated by performing a discovery process. During the discovery process, communication channels between a management controller and other devices may be characterized to identify whether any MCEDs are operably connected via the communication channels. A list of MCEDs or other types of representations may be obtained via the discovery process.

At operation 322, the MCEDs are registered with the management controller. The MCEDs may be registered by obtaining, for each MCED, (i) a device identifier, and (ii) URIs corresponding to different types of undesired operating states (e.g., may be identified by error message identifiers included in a data stream). For example, the management controllers of the MCEDs may provide the aforementioned information responsive to requests or via other methods.

At operation 324, for each MCED, an association between a device identifier, error message identifiers, and URIs are obtained. Any number of associations may be obtained via this process such that, for each MCED, different types of undesired operating states (e.g., indicated by the error message identifiers) are associated with different URIs.

For example, an association may be obtained that relates a device identifier and an error message identifier (e.g., an identifier of an undesired operating state) to a URI. Thus, for a given device identifier and error message identifier, a corresponding URI may be identified via the association.

At operation 326, corresponding records are obtained based on the associations. The records may be obtained by adding the associations as entries to a device list or other type of data structure. The resulting data structure may be usable to lookup URIs based on device identifiers and types of undesired operating states. As discussed with respect to FIG. 3A, such information may be obtained via a data stream from a MCED.

The method may end following operation 326.

Figure 4:
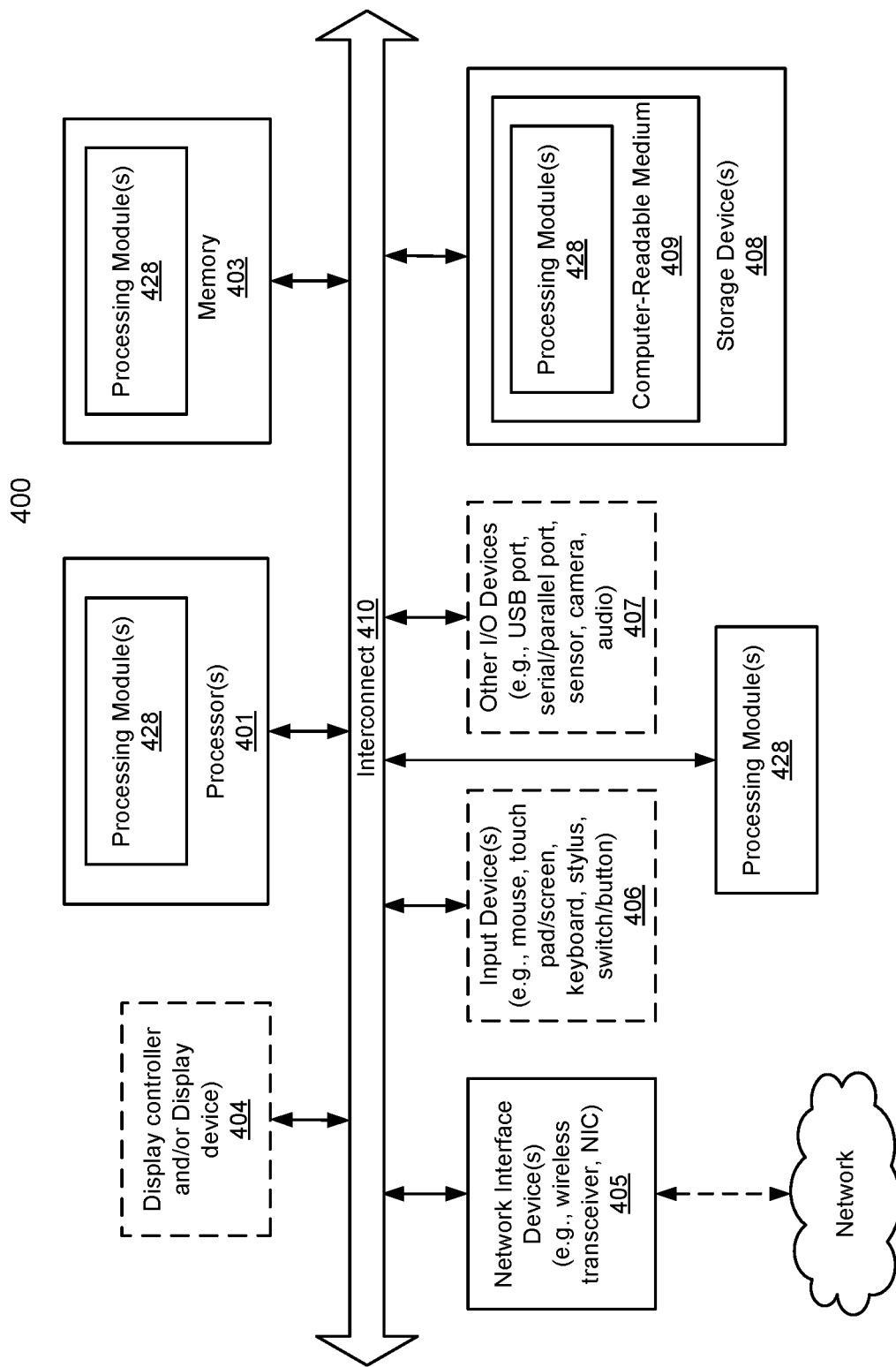
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing communications between a management system and management controller embedded devices (MCEDs), the method comprising:
    obtaining, by a management controller of a data processing system, a device identifier from a portion of a stream from a MCED of the MCEDs, the portion of the stream indicating that the MCED is in an undesired operating state;
    identifying, by the management controller, a uniform resource identifier based on the undesired operating state;
    obtaining, by the management controller and from the MCED, a portion of a log using the uniform resource identifier;
    generating, by the management controller, a condition report for the data processing system based at least in part on the portion of the log and the undesired operating state;
    providing, by the management controller, the condition report to the management system;
    obtaining, by the management controller and responsive to the condition report, a management operation; and
    initiating, by the management controller, performance of the management operation to manage the undesired operating state.

2. The method of claim 1, further comprising:
    prior to obtaining the communication:
        enumerating, by the management controller, the MCEDs;
        registering, by the management controller, the MCED of the MCEDs;
        obtaining, by the management controller, an association between a device identifier tag provided by the MCED during the registering of the MCED, error message identifiers that the MCED adds to the stream, and the uniform resource identifier obtained during the registering of the MCED; and
        establishing, by the management controller, a record based on the association.

3. The method of claim 2, wherein registering the MCED comprises:
    providing, by the management controller, a list of undesired operating states to the MCED; and
    obtaining, by the management controller, a corresponding list of uniform resource identifiers comprising the uniform resource identifier.

4. The method of claim 3, wherein obtaining the portion of the log comprises:
    sending, by the management controller, a log request directed to a first resource indicator of the corresponding list of uniform resource identifiers; and
    obtaining, by the management controller and responsive to the log request, a portion of a second log, the portion of the second log comprising log entries relevant for remediation of a second undesired operating state of the undesired operating states corresponding to the first resource indicator.

5. The method of claim 4, wherein generating the condition report comprises:
populating a first portion of the condition report with first information based on the portion of the log;
populating a second portion of the condition report with second information based on the portion of the log; and
adding an indicator to the condition report indicating that the first portion and the second portion are both associated with the MCED.

6. The method of claim 5, wherein generating the condition report further comprises:
populating a third portion of the condition report with third information based on a portion of a third log from a second MCED of the MCEDs; and
adding a second indicator to the condition report indicating that the third portion is associated with the second MCED.

7. The method of claim 6, wherein generating the condition report further comprises:
adding a third indicator to the condition report indicating that the MCED is operating in the undesired operating state; and
adding a fourth indicator to the condition report indicating that the MCED is operating in another undesired operating state of the undesired operating states.

8. The method of claim 7, wherein the data processing system hosts the MCEDs, and each of the MCEDs is an end point presenting device.

9. A non-transitory machine-readable medium having instructions stored therein, which when executed by a processor, cause the processor to perform operations for managing communications between a management system and management controller embedded devices (MCEDs), the operations comprising:
obtaining, by a management controller of a data processing system, a device identifier from a portion of a stream from a MCED of the MCEDs, the portion of the stream indicating that the MCED is in an undesired operating state;
identifying, by the management controller, a uniform resource identifier based on the undesired operating state;
obtaining, by the management controller and from the MCED, a portion of a log using the uniform resource identifier;
generating, by the management controller, a condition report for the data processing system based at least in part on the portion of the log and the undesired operating state;
providing, by the management controller, the condition report to the management system;
obtaining, by the management controller and responsive to the condition report, a management operation; and
initiating, by the management controller, performance of the management operation to manage the undesired operating state.

10. The non-transitory machine-readable medium of claim 9, wherein the operations further comprise:
prior to obtaining the communication:
enumerating, by the management controller, the MCEDs;
registering, by the management controller, the MCED of the MCEDs;
obtaining, by the management controller, an association between a device identifier tag provided by the MCED during the registering of the MCED, error message identifiers that the MCED adds to the stream, and the uniform resource identifier obtained during the registering of the MCED; and
establishing, by the management controller, a record based on the association.

11. The non-transitory machine-readable medium of claim 10, wherein registering the MCED comprises:
providing, by the management controller, a list of undesired operating states to the MCED; and
obtaining, by the management controller, a corresponding list of uniform resource identifiers comprising the uniform resource identifier.

12. The non-transitory machine-readable medium of claim 11, wherein obtaining the portion of the log comprises:
sending, by the management controller, a log request directed to a first resource indicator of the corresponding list of uniform resource identifiers; and
obtaining, by the management controller and responsive to the log request, a portion of a second log, the portion of the second log comprising log entries relevant for remediation of a second undesired operating state of the undesired operating states corresponding to the first resource indicator.

13. The non-transitory machine-readable medium of claim 12, wherein generating the condition report comprises:
populating a first portion of the condition report with first information based on the portion of the log;
populating a second portion of the condition report with second information based on the portion of the log; and
adding an indicator to the condition report indicating that the first portion and the second portion are both associated with the MCED.

14. The non-transitory machine-readable medium of claim 13, wherein generating the condition report further comprises:
populating a third portion of the condition report with third information based on a portion of a third log from a second MCED of the MCEDs; and
adding a second indicator to the condition report indicating that the third portion is associated with the second MCED.

15. The non-transitory machine-readable medium of claim 14, wherein generating the condition report further comprises:
adding a third indicator to the condition report indicating that the MCED is operating in the undesired operating state; and
adding a fourth indicator to the condition report indicating that the MCED is operating in another undesired operating state of the undesired operating states.

16. The non-transitory machine-readable medium of claim 15, wherein the data processing system hosts the MCEDs, and each of the MCEDs is an end point presenting device.

17. A data processing system, comprising:
management controller embedded devices (MCEDs); and
a management controller comprising:
a processor; and
a memory coupled to the processor to store instructions, which when executed by the processor, cause the processor to perform operations for managing communications between a management system and the MCEDs, the operations comprising:

obtaining, by a management controller of a data processing system, a device identifier from a portion of a stream from a MCED of the MCEDs, the portion of the stream indicating that the MCED is in an undesired operating state;

identifying, by the management controller, a uniform resource identifier based on the undesired operating state;

obtaining, by the management controller and from the MCED, a portion of a log using the uniform resource identifier;

generating, by the management controller, a condition report for the data processing system based at least in part on the portion of the log and the undesired operating state;

providing, by the management controller, the condition report to the management system;

obtaining, by the management controller and responsive to the condition report, a management operation; and initiating, by the management controller, performance of the management operation to manage the undesired operating state.

18. The data processing system of claim 17, wherein the operations further comprise:

prior to obtaining the communication:

enumerating, by the management controller, the MCEDs;

registering, by the management controller, the MCED of the MCEDs;

obtaining, by the management controller, an association between a device identifier tag provided by the MCED during the registering of the MCED, error message identifiers that the MCED adds to the stream, and the uniform resource identifier obtained during the registering of the MCED; and establishing, by the management controller, a record based on the association.

19. The data processing system of claim 18, wherein registering the MCED comprises:

providing, by the management controller, a list of undesired operating states to the MCED; and obtaining, by the management controller, a corresponding list of uniform resource identifiers comprising the uniform resource identifier.

20. The data processing system of claim 19, wherein obtaining the portion of the log comprises:

sending, by the management controller, a log request directed to a first resource indicator of the corresponding list of uniform resource identifiers; and obtaining, by the management controller and responsive to the log request, a portion of a second log, the portion of the second log comprising log entries relevant for remediation of a second undesired operating state of the undesired operating states corresponding to the first resource indicator.

* * * * *